3,323,919
PREPARATION OF CONCENTRATED FERMENTED MALT BEVERAGE OF LOW HOP CONTENT
Emil A. Malick, Bartlesville, Okla., assignor to Phillips Petroleum Company, a corporation of Delaware
Filed Sept. 16, 1963, Ser. No. 309,090
6 Claims. (Cl. 99—31)

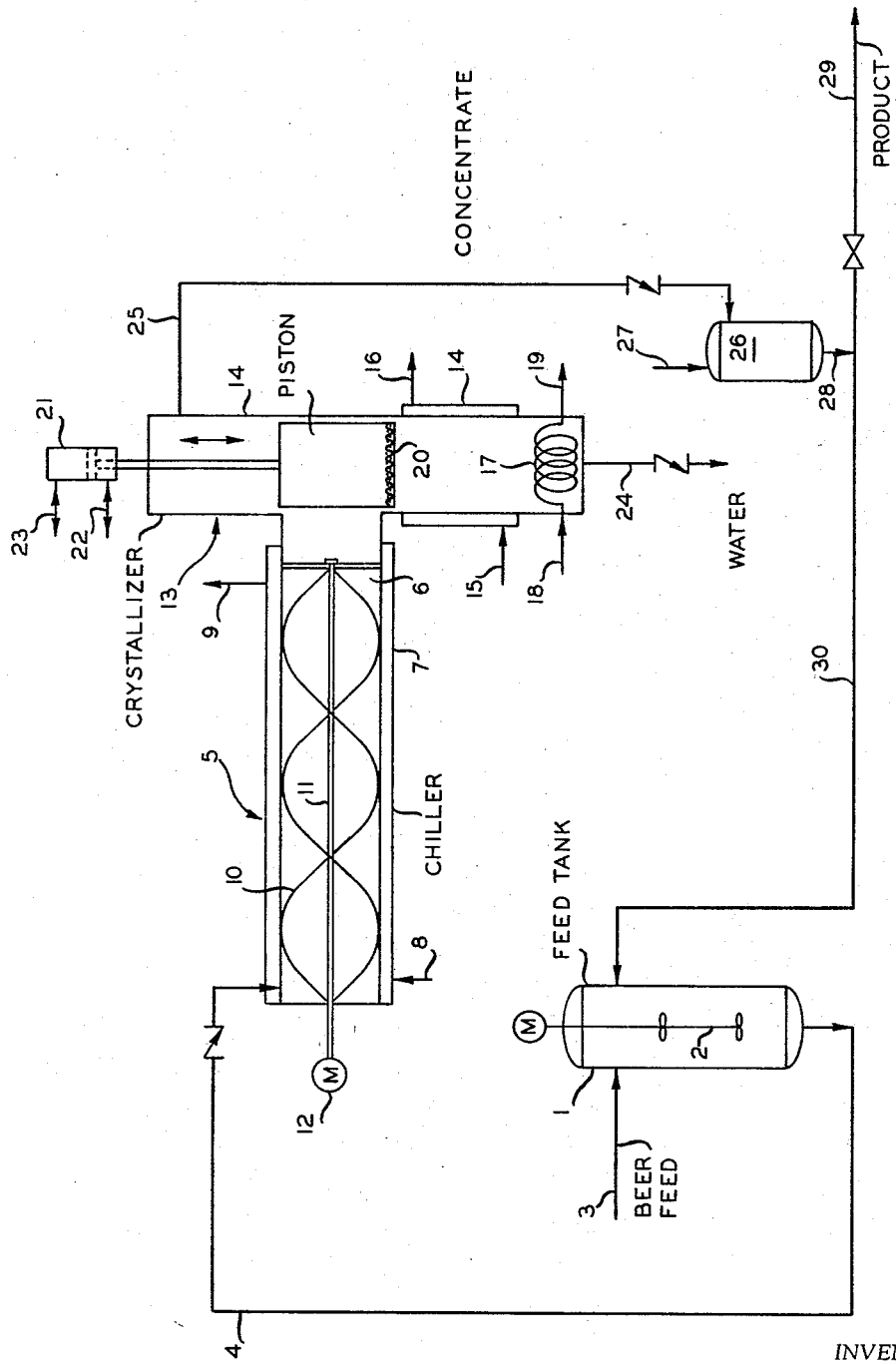

This invention relates to a process for the preparation of a novel fermented malt beverage. In another aspect, it relates to the fermented malt beverage so produced as a new composition of matter.

The concentration of aqueous solutions, such as fruit juices, wines and beer, by crystallization to remove water therefrom and produce a concentrate which is reconstituted by dilution thereof with water, is receiving increasing attention in the food processing and allied industries. In the case of beer, it has been shown that significant savings in brewing, storage, and shipping can be gained by the freeze concentration of beer and its reconstitution; that the taste, aroma, and keeping qualities of the reconstituted beer are as good as, and in some cases better than, the beer produced by the present standard brewing process; and that the useful storage or shelf life of the beer, whether stored in a concentrated or reconstituted state, is greatly increased.

In the freeze concentration of beer, especially by the process known in the brewing industry as the Phillips Fractional Crystallization Process and basically covered by U.S. Reissue Patent 23,810 to J. Schmidt and U.S. Patent 2,854,494 to R. W. Thomas, the concentrate which is produced from beer made by the standard brewing process generally will have an unacceptable harsh, bitter taste which is generally unpalatable to the layman as well as brewmasters and beer connoisseurs, though when reconstituted such concentrate yields an excellent beverage.

Accordingly, an object of this invention is to provide a process for preparing a novel fermented malt beverage. Another object is to provide such a malt beverage as a new composition of matter. Further objects and advantages of this invention will become apparent from the following description and accompanying drawing in which the single figure schematically illustrates an embodiment of fractional crystallization apparatus which can be used in preparing the novel malt beverage of this invention.

I have now discovered that a novel concentrate of beer, which is itself an appealing, palatable malt beverage having excellent taste and aroma, can be made by freeze concentration of beer brewed from wort hopped with an amount of hops that is inversely proportional to the amount of water removed from the beer by said freeze concentration, said amount of hops being substantially below that used in the standard beer brewing process. For example, where 75 percent of the water is removed from the beer by freeze concentration thereof, the amount of hops added to the wort and boiled therewith will be, according to this invention, about one-fourth the amount generally used in making a conventional beer, or a reconstituted beer from a beer concentrate. In other respects, the beer from which the novel beverage or concentrate of this invention is obtained can be made or brewed by the standard brewing process, such as that used in making the American type of Pilsener beer. Preferably, in addition to employing the reduced amount of hops, as described above, any conventional additives normally used in brewing which will, upon freeze concentration of the beer, attain an undesirably high level in the concentrate such as to degrade the taste and other desirable properties thereof, are also reduced in the amount conventionally employed.

The amount of water which is removed from the low-hops beer by freeze concentration thereof, according to this invention, can vary and generally will be in the range of 25 to 85 weight percent, preferably 70 to 80 weight percent. Correspondingly, the inversely proportional amount of hops to be used in making the beer to be freeze concentrated will generally be about 5 to 20 pounds per 100 barrels of brew, preferably about 10 to 16 pounds per 100 barrels of brew.

The wort, from which the novel beverage of this invention is made, can be conventionally prepared by mashing barley malt with water, for example at 67 to 70° C., and, if desired, suitable precooked adjuncts, such as unmalted barley, corn grits or flakes, rice, and like cereal and starchy products, the malt usually making up from 50 to 75 percent of the total brewing materials. The temperature is thereafter raised, for example to 75° C., to inactivate the enzymes. Undissolved grain and husks are removed from the mash generally in so-called lauter tubs or mash filters. The resulting soluble or sweet wort is then hopped in a brewing kettle, using the small quantity of hops mentioned above. If desired, the hops used can be made up of 25 to 30% imported or choice Fuggles and 70 to 75% domestic hops. Following hopping, or boiling of the hopped wort, brewing can be completed according to the standard brewing process using the usual standard brewing procedures, equipment and materials, all of which are of general knowledge and are substantially the same throughout the industry in the United States. For example, the hopped wort (or brew) is strained, cooled, and subjected to bottom fermentation by the addition of a yeast, e.g., one pound of liquid yeast per barrel of brew. After fermentation is completed, the yeast is removed and the "young beer" or ruh is clarified, aged, pasteurized, stored, filtered, chillproofed, carbonated, finished, and filtered. Alternatively, any one or all of these latter operations can be eliminated and it is within the scope of this invention to prepare the novel beverage of this invention by freeze concentrating the beer, with or without first filtering it, as it leaves the fermenters, or as it leaves the clarifying tanks or cellar, or after it leaves the lagering cellar. Such alternatives can be used because during freeze concentration suspended solids such as yeast and hop resins will be removed along with the ice. Because of the low temperatures of the free concentration step, e.g., 25 to 32° F., the solubilities of undesirable materials such as those which normally give rise to haze and sediment (which materials are normally removed by clarification and on storage or lagering) are decreased and they precipitate and can be removed with the ice. Also, since the freeze concentration is carried out at low temperatures, and the alcoholic content is increased, bacterial activity and undesirable changes due to the activity of residual yeast cells or spores are decreased or stopped, and pasteurization can be eliminated without impairing the desirable shelf life and keeping qualities of the novel concentrate.

The ethyl alcohol content is increased by the freeze concentration, for example a low-hops beer with 3 to 8 volume percent alcohol can be concentrated to increase the alcohol content to 5 to 25 volume percent, preferably 7 to 18 volume percent. The alcoholic content of the concentrate will vary with the alcoholic content of the beer which is concentrated and the number of concentration stages used. As compared with a concentrate prepared by freeze concentration of a standard beer made with about four times as much hops, the concentrate of this invention has about one-half or less the amount of furfuryl alcohol content, e.g., the concentrate of this invention has less than 0.3 weight percent furfuryl alcohol, and can have as low as 0.002 weight percent furfuryl alcohol.

The freeze concentration step can be carried out batchwise, for example using a plurality of alternate ice-generators and centrifuges connected in series, or, preferably, by continuously cooling the beer to produce a slurry of ice crystals and mother liquor, melting the crystals, passing at least a portion of the melt in contact with and countercurrent to the crystals, and separating the mother liquor (or beer concentrate) and the melted ice, such continuous process being preferably carried out in a plurality of stages, e.g. three. If desired, the concentrate which is produced by the freeze concentration step can be filtered to remove any precipitated materials not removed with the melted ice. Suitable apparatus for carrying out the freeze concentration of the low-hops beer by a continuous process is that shown in said patents to Schmidt and Thomas. Schmidt's process involves moving a mixture of crystals and adhering liquid through a liquid removal zone, a reflux zone and a melting zone, removing liquid in said liquid removal zone, melting crystals in said melting zone, withdrawing part of the melt from the melting zone and forcing another part of the melt in a direction countercurrent to the movement of crystals in said reflux zone. In Thomas' process (which is an improvement over the separation of the type disclosed by Schmidt), the solids in the purification zone are countercurrently contacted with a pulsating flow of reflux liquid by application against the melt of pulsating pressure generated by a pulse pump, the pulsation of the reflux liquid occurring during sustained application of force to the crystals to feed the same into the liquid removal zone.

The alcoholic malt beverage or elixir prepared according to this invention differs from beer in taste and is wholly unlike any drink hereto produced, although it has a basic beer-like flavor. Unlike reconstituted beer of concentrates made from beer brewed with the regular amount of hops, reconstituted beer of the novel concentrates of this invention has a terrible taste. Like beer, the malt beverage of this invention will have varying amounts of unfermented sugars and dextrins, proteinlike substances, flavoring constituents derived from malt and yeast, and minor constituents such as various inorganic salts, metabolic by-products of yeast, vitamins, traces of iron and copper, etc. The beverage of this invention will usually have some residual carbonation and, if desired, it can be further carbonated to 0.4–0.6 weight percent carbon dioxide.

The accompanying drawing schematically illustrates fractional crystalizing apparatus which can be used in preparing the novel fermented malt beverage of this invention. The apparatus comprises a feed tank 1 provided with suitable agitation means 2 and a pipe 3 for introducing, either batch-wise or continuously, low-hops beer feed which is to be concentrated according to this invention. The feed from tank 1 is continuously passed via line 4 to a chiller 5 or the like having a cylindrical zone 6 surrounded by a cooling jacket 7 having an inlet pipe 8 and outlet pipe 9 for a refrigerant, such as Freon. Positioned within chilling zone 6 is an agitating or scraping means 10, which is designed to prevent the accumulation of solid material on the heat exchange surface. Scraping means 10 can be constructed of strips of metal or other suitable materials known in the art and fabricated in the form of a helix, as indicated in the drawing, or can be straight. Scraping means 10 is mounted on a rotatable shaft 11 which is connected to any source of power for rotating the scraping means, such as motor 12. Chiller 5 serves to chill the feed passed therethrough and convert it into a slurry of ice crystals, e.g., 10–30 weight percent ice, which will have the consistency of sherbert. The slurry from chiller 5 enters crystallizer column 13, which comprises a cylindrical shell 14 which has a cooling jacket 14 surrounding its lower end with an inlet pipe 15 and outlet pipe 16 for refrigerant such as Freon. Positioned below jacket 14 is a heater 17 having an inlet pipe 18 and an outlet pipe 19 for a water-glycol mixture or the like. Reciprocally disposed within the column is a piston 20 which is reciprocated by means of an air cylinder 21 having air supply lines 22 and 23 for the application of pressure on alternate sides of a piston located therein. As shown in the drawing, piston 20 is at the bottom of its downstroke, at which point it closes off the chiller outlet. Piston 20 is porous and its head can be made out of a filter screen to permit the flow of mother liquor through the head. Melted crystals, i.e. water, are withdrawn via line 24 from the bottom of column 13 and mother liquor is withdrawn via line 25 from the upper end of the column. The piston 20 moves the crystals into the vicinity of heater 17, where crystals are melted. All of the melted ice does not leave the column via line 24 immediately after melting; rather, part of the melted ice is forced up the column countercurrent to the movement of the descending crystals by means of the compacting force of the piston 20 on the crystals. This causes separation of occluded mother liquor from the ice crystals. The mother liquor passes through porous piston 20 and moves countercurrent back up the column and is removed via line 25. The concentrate or mother liquor can pass up to a concentrate tank 26, which can be pressured with carbon dioxide supplied by pipe 27. The concentrate can be withdrawn from tank 26 via line 29 and yielded as product 29, or some or all of the concentrate can be returned via line 30 to feed tank 1. In a batch operation, all of the concentrate can be returned to feed tank 1 and recycled through the process until sufficient water has been removed from the beer feed. It may be desirable, for example in a continuous operation, to recycle a proportion of the melted ice or water from line 24 back to the feed tank 1.

As an example of this invention, a finished beer was fermented from a 12% Balling brew prepared from a low-hops wort having the composition set forth in Table I.

TABLE I

| | Lbs./100 barrels brew |
|---|---|
| Malt | 2800 |
| Grits | 2000 |
| Hops | 14 |

Apparatus like that shown in the accompanying drawing was used to concentrate a batch of 54 gals. of said beer. The feed tank used had a capacity of 50 gals. and it was filled with the beer, with an additional 4 gals. being pressured into the chiller, which had a 4 in. I.D. and was 8 ft. in length. The chiller was cooled by means of Freon. The crystallizer column had a 4 in. I.D. and was provided with a piston having a filter screen with a filter area of 12.6 sq. in. and the piston had a stroke of 8¾ in. Freon was used as a refrigerant in the lower end of the column and a hot water-glycol mixture was used in the heater at the base of the column.

In starting up the crystallizer, the piston was maintained at the top of its stroke and no heating fluid was passed into the heating coil at the base of its column. After about 9 hrs. of crystallization, a sufficient bed of crystals was disposed in the bottom of the column on top of the heating coil, and the run was begun, starting with the circulation of the hot water-glycol mixture through the heating coil and the reciprocation of the piston, which developed a pressure of 400 p.s.i.g.

In this batch operation, the concentrate produced was continuously returned to the feed tank and the amount of water removed at the end of the run was 73.8% of the beer feed. Table II sets forth the operating data.

Table II

| Elapsed time after forming crystal bed, hr. | Temperatures, °F. | | | | | |
|---|---|---|---|---|---|---|
| | Exit Freon 9 from chiller 5 | Slurry passed to column 13 | Freon 15 to column jacket 14 | Bottom product 24 from column 13 | Water 18 passed to column heater 17 | Water 19 withdrawn from heater 17 |
| 9 | 24.0 | 27.0 | 26.0 | 48 | 153 | 110 |
| 17 | 23.0 | 25.4 | 26.0 | 48 | 152 | 107 |
| 23 | 21.9 | 24.5 | 27.0 | 47 | 149 | 100 |
| 31 | 18.0 | <22 | 25.0 | 45 | 132 | 75 |
| 39 | 15.2 | <22 | 25.0 | 46 | 130 | 74 |
| 47 | 10.0 | <22 | 26.0 | 47 | 137 | 89 |
| 55 | 7.0 | <22 | 26.0 | 48 | 144 | 89 |
| 63 | 14.0 | <22 | 26.0 | 47 | 144 | 90 |
| 72 | 8.5 | <22 | 26.0 | 46 | 145 | 93 |

| Elapsed time after forming crystal bed, hr. | Pressures, p.s.i.g. | | | Flow rates | | Alcohol content, vol. percent | | |
|---|---|---|---|---|---|---|---|---|
| | Feed tank 1 | Concentrate tank 26 | Bottom product 24 | Water 18 passed to column heater 17, lbs./hr. | Bottom product 24 from column 13, gals./hr. | Chiller feed 4 | Mother liquor 25 | Bottom product 24 |
| 9 | 8.5 | 10.0 | 102 | 24.5 | 0.57 | 5.9 | 7.2 | 0.37 |
| 17 | 9.0 | 10.0 | 100 | 24.5 | 0.63 | 6.7 | 8.5 | 0.31 |
| 23 | 9.0 | 10.0 | 98 | 22.0 | 0.50 | 7.0 | 9.5 | 0.31 |
| 31 | 9.0 | 10.0 | 94 | 11.0 | 0.32 | 7.8 | 11.8 | 0.30 |
| 39 | 9.0 | 10.0 | 100 | 11.0 | 0.32 | 8.5 | 14.0 | 0.37 |
| 47 | 9.0 | 10.0 | 100 | 17.5 | 0.45 | 10.2 | 17.5 | 0.44 |
| 55 | 9.0 | 10.0 | 103 | 14.5 | 0.45 | 10.4 | 19.2 | 0.50 |
| 63 | 9.0 | 10.0 | 100 | 18.0 | 0.49 | 12.8 | 16.1 | 0.40 |
| 72 | 9.0 | 10.0 | 100 | 18.0 | 0.50 | | [1] 16.6 | |

[1] This is the alcoholic content at the end of the run of the product in the feed tank combined with melted chiller residue.

During the operation as described above, a sample was withdrawn from the feed tank 50 hrs. after the start of the run (i.e., 50 hrs. after formation of the desired crystal bed) and it had an ethyl alcohol content of 11.2 vol. percent and contained 0.02 wt. percent furfuryl alcohol. The taste of this sample of the alcoholic malt beverage of this invention was excellent as compared to a control concentrate having an ethyl alcohol content of 14.7 vol percent and a furfuryl alcohol content of 0.05 wt. percent which control concentrate was prepared in a similar manner from a regular beer which employed four times as much hops in the brew.

Various modifications and alterations of this invention will become apparent to those skilled in the art without departing from the scope and spirit of this invention, and it should be understood that this invention is not to be limited unduly to that set forth herein for illustrative purposes.

I claim:

1. A process for preparing a fermented malt beverage, which comprises boiling a wort with about 5 to 20 pounds of hops per 100 barrels of brew, straining, cooling, and fermenting the resulting brew, removing a portion of water from the resulting fermented beer by freeze crystallization thereof, and recovering the resulting mother liquor as said beverage.

2. A process for preparing a fermented malt beverage, which comprises boiling a wort with about 5 to 20 pounds of hops per 100 barrels of brew, straining, cooling, and fermenting the resulting brew, cooling the resulting fermented beer to form a slurry of ice crystals and mother liquor, passing said slurry into a separation zone, passing said crystals through a purification zone toward a melting zone, melting a compact mass of crystals in said melting zone passing a portion of the resulting melt into said mass of crystals, withdrawing a portion of said melt from said zone, and withdrawing said mother liquor from said zone as said beverage.

3. The process according to claim 2, wherein said fermented beer has an alcohol content of 3 to 8 volume percent, the amount of water removed from said fermented beer is 25 to 85 weight percent thereof, and the alcohol content of said beverage is 4 to 25 volume percent.

4. The process according to claim 2, wherein the amount of hops boiled with said wort is 10 to 16 pounds per 100 barrels of brew, said fermented beer has an alcohol content of 3 to 8 volume percent, the amount of water removed from said fermented beer is 70 to 80 weight percent, and the alcohol content of said beverage is 10 to 16 volume percent.

5. The process according to claim 4, wherein said fermented beer which is cooled is ruh beer.

6. The process according to claim 4, wherein said fermented beer which is cooled is a finished lagered beer.

References Cited

UNITED STATES PATENTS

2,921,968  1/1960  Green.
3,193,395  7/1965  Tabler et al. _____ 99—31 X

FOREIGN PATENTS

354,766  8/1931  Great Britain.

A. LOUIS MONACELL, *Primary Examiner.*

D. M. NAFF, *Assistant Examiner.*